United States Patent
Ikeda et al.

(10) Patent No.: US 7,247,409 B2
(45) Date of Patent: Jul. 24, 2007

(54) ALKALINE STORAGE BATTERY AND HYDROGEN STORAGE ALLOY ELECTRODE USED THEREFOR

(75) Inventors: Kazutaka Ikeda, Kamakura (JP); Susumu Kikuyama, Chigasaki (JP); Akiko Miyahara, Chigasaki (JP); Kohji Yuasa, Chigasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 490 days.

(21) Appl. No.: 10/370,265

(22) Filed: Feb. 21, 2003

(65) Prior Publication Data

US 2003/0134197 A1 Jul. 17, 2003

(30) Foreign Application Priority Data

Aug. 22, 2000 (JP) .............................. 2000-250648
Jan. 17, 2001 (JP) .............................. 2001-008496
Feb. 14, 2001 (JP) .............................. 2001-037624

(51) Int. Cl.
*H01M 4/78* (2006.01)
(52) U.S. Cl. ..................... 429/242; 429/233; 429/241
(58) Field of Classification Search ........ 429/240–244, 429/233, 236
See application file for complete search history.

(56) References Cited

U.S. PATENT DOCUMENTS

| | | | | |
|---|---|---|---|---|
| 4,151,331 A | * | 4/1979 | Hug et al. ..................... 429/94 |
| 5,264,306 A | * | 11/1993 | Walker et al. ................ 429/160 |
| 5,527,638 A | * | 6/1996 | Kinoshita et al. ........... 429/101 |
| 5,529,857 A | * | 6/1996 | Nogami et al. ............... 429/59 |
| 5,542,958 A | * | 8/1996 | Furukawa ................... 29/623.1 |
| 5,840,444 A | * | 11/1998 | Takeshima et al. ......... 429/223 |
| 5,972,181 A | * | 10/1999 | Coin et al. .................. 204/242 |
| 6,139,705 A | * | 10/2000 | Brown et al. ............... 204/284 |
| 6,352,622 B1 | * | 3/2002 | Brown et al. ............... 204/242 |
| 6,436,580 B1 | * | 8/2002 | Sugikawa .................... 429/233 |

FOREIGN PATENT DOCUMENTS

| JP | 55-109376 A | 8/1980 |
|---|---|---|
| JP | 3-101055 A | 4/1991 |

(Continued)

*Primary Examiner*—Mark Ruthkosky
(74) *Attorney, Agent, or Firm*—McDermott Will & Emery LLP

(57) ABSTRACT

The hydrogen storage alloy electrode comprises: a conductive core material; and an active material layer which contains a hydrogen storage alloy powder and is carried on said core material, and the alloy powder has any shape selected from the group consisting of spherical shapes, substantially spherical shapes and oval shapes. The core material comprises: a conductive sheet; and fibrous or columnar sintered nickel pieces bonded to the surface of the conductive sheet. Alternatively, the active material layer comprises: an active material layer A which contains a hydrogen storage alloy powder A with a mean particle size "a" and is carried on said core material; and an active material layer B which contains a hydrogen storage alloy powder B with a mean particle size "b" and is carried on said active material layer A (wherein a<b). Alternatively, the active material layer further contains a crushed alloy powder having on the surface thereof at least one selected from the group consisting of nickel and cobalt. The use of such electrode provides an alkaline storage battery excellent in both discharge characteristics and cycle life.

1 Claim, 5 Drawing Sheets

FOREIGN PATENT DOCUMENTS

| | | |
|---|---|---|
| JP | 3-116655 | 5/1991 |
| JP | 7-85866 A | 3/1995 |
| JP | 7-105943 A | 4/1995 |
| JP | 7-201329 A | 8/1995 |
| JP | 8-298124 A | 11/1996 |
| JP | 9-120819 A | 5/1997 |
| JP | 10-50310 A | 2/1998 |
| JP | 10-162835 A | 6/1998 |
| JP | 10-172546 A | 6/1998 |
| JP | 10-223232 * | 8/1998 |
| JP | 11-97002 A | 4/1999 |
| JP | 11-102698 A | 4/1999 |
| JP | 11-162463 A | 6/1999 |
| JP | 11-283618 A | 10/1999 |

* cited by examiner

ALKALINE STORAGE BATTERY AND HYDROGEN STORAGE ALLOY ELECTRODE USED THEREFOR

TECHNICAL FIELD

The present invention relates to alkaline storage batteries and hydrogen storage alloy electrodes used therefor.

BACKGROUND ART

Alkaline storage batteries using a hydrogen storage alloy are widely employed as power sources for various cordless appliances or electronic equipment and the like. Among them, nickel-metal hydride storage batteries are harmless to the environment, and have high energy density. For this reason, nickel-metal hydride storage batteries are considered promising as power sources for electric tools or electric vehicles which necessitate charging and discharging at a large current, and also as back-up power sources, for which a long-term reliability is required.

Generally, an $MmNi_5$ alloy having a $CaCu_5$ type crystal structure, in which Ni is partly replaced with metal such as Co, Mn or Al, is employed as a hydrogen storage alloy for use in the nickel-metal hydride storage battery. Here, Mm refers to a mixture of rare earth elements.

The hydrogen storage alloy is produced, for example, by the processes such as: casting in which molten alloy is flowed into a mold; roll-quenching in which molten alloy is flowed between twin rolls, followed by quenching; centrifugal spraying in which molten alloy is injected onto a high-speed rotating disc; and atomization in which molten alloy is sprayed into an inert gas.

In order to use an alloy produced by casting or roll-quenching for the electrodes of a nickel-metal hydride storage battery, it is necessary to crush the alloy into a particle size of not more than 100 μm, either by a mechanical process or through a step of absorbing/desorbing hydrogen gas. In contrast, atomization produces a fine spherical alloy powder, which does not require any crushing step.

An alloy powder having a rough surface produced by crushing is likely to be pulverized during charge/discharge cycles, whereas such pulverization is suppressed for a spherical alloy powder because of the uniform alloy structure. A spherical alloy powder has a smaller specific surface area than a crushed alloy powder, so that it is also superior in corrosion resistance. As described in Japanese Unexamined Patent Publication No. Hei 3-116655, a spherical alloy powder can be filled into electrodes at a higher density than a crushed alloy powder.

For the above reasons, a spherical alloy powder is mainly used. A spherical alloy powder, however, has a small specific surface area. Moreover, the contacts between the particles of the alloy powder and between the alloy powder and the conductive core material of the electrode are point contacts. Accordingly, an electrode using the spherical alloy powder has a disadvantage that its current collection performance is inferior to that of one using a crushed alloy powder. FIG. 1 shows a sectional schematic view of a conventional electrode using a spherical alloy powder. From FIG. 1, it can be seen that the contact between a conductive core material 1 and a spherical alloy powder 2 of the electrode is given by point contact.

In view of the above, Japanese Unexamined Patent Publication No. Hei 11-97002 proposes the combined use of a spherical alloy powder and a crushed alloy powder. Additionally, Japanese Unexamined Patent Publication No. Hei 11-283618 suggests an electrode having a two-layer structure consisting of one layer comprising a crushed alloy powder and another layer comprising a spherical alloy powder. In other words, the crushed alloy powder and the spherical alloy powder are used in combination in order to improve the current collection performance of the electrode.

However, a crushed alloy powder is more susceptible to pulverization during charge/discharge cycles than a spherical alloy powder. Accordingly, the current collection performance of electrodes containing a crushed alloy powder is decreased gradually. Moreover, the pulverization increases the surface area of the alloy powder in contact with an electrolyte, thereby causing the constituent elements of the alloy to be dissolved and leading to unnecessary consumption of the electrolyte. This results in problems such as the increase in internal resistance and deterioration in discharge characteristics or cycle characteristics of the battery.

The present invention solves the above-discussed problems and an object of the present invention is to provide an alkaline storage battery excellent in both discharge characteristics and cycle characteristics, and a hydrogen storage alloy electrode used therefor.

DISCLOSURE OF INVENTION

A spherical hydrogen storage alloy powder having a smooth surface, produced by atomization or centrifugal spraying, is difficult to be pulverized. Here, the term "spherical" is intended to include substantially spherical, oval and similar shapes. Moreover, the spherical alloy powder has a smaller specific surface area than an alloy powder having a rough surface, produced by mechanical crushing, so that it is more resistant to corrosion by an alkaline electrolyte. However, the use of the spherical alloy powder renders the contact between a conductive core material and the alloy powder in the electrode insufficient, presenting the problem of the reduction in discharge characteristics. Therefore, the present invention improves the contact between the conductive core material and the spherical alloy powder, thereby providing an alkaline storage battery excellent in both discharge characteristics and cycle characteristics.

The present invention relates to a hydrogen storage alloy electrode comprising: a conductive core material; and an active material layer which contains a hydrogen storage alloy powder and is carried on the core material, the alloy powder having any shape selected from the group consisting of spherical shapes, substantially spherical shapes and oval shapes, the core material comprising a conductive sheet and fibrous or columnar sintered nickel pieces bonded to the surface of the conductive sheet.

The present invention also relates to a hydrogen storage alloy electrode comprising: a conductive core material; and an active material layer which contains a hydrogen storage alloy powder and is carried on the core material, the alloy powder having any shape selected from the group consisting of spherical shapes, substantially spherical shapes and oval shapes, the core material being a mesh sheet having a plurality of lines of slits discontinuously formed thereon in a longitudinal direction of the sheet, the slits being opened in directions perpendicular to the sheet in a substantially rhombus-shaped form.

The present invention also relates to a method of producing a hydrogen storage alloy electrode, comprising the steps of: (1) discontinuously forming in a conductive sheet a plurality of lines of slits in a longitudinal direction of the sheet, leaving slitless portions between longitudinally adjacent slits, wherein a longitudinal length of the slitless portions is shorter than a length of the slits, the plurality of lines of slits being arranged in a staggered manner; (2) causing portions that are sandwiched between widthwise adjacent slits of the sheet to bulge upward and downward with respect to the sheet in an alternating manner such that the slits are opened in directions perpendicular to the sheet in a substantially rhombus-shaped form, thereby producing a core material which is a mesh sheet; and (3) filling into the mesh sheet a hydrogen storage alloy powder having any shape selected from the group consisting of spherical shapes, substantially spherical shapes and oval shapes.

The present invention also relates to a hydrogen storage alloy electrode comprising: a conductive core material; an active material layer A which contains a hydrogen storage alloy powder A with a mean particle size "a" and is carried on the core material; and an active material layer B which contains a hydrogen storage alloy powder B with a mean particle size "b" and is carried on the active material layer A (wherein a<b), the alloy powders A and B each having any shape selected from the group consisting of spherical shapes, substantially spherical shapes and oval shapes.

It is preferable that the ratio of thickness $A_d$ of the active material layer A to thickness $B_d$ of the active material layer B, $A_d:B_d$, is 1:9 to 3:7.

It is preferable that the mean particle size "a" of the alloy powder A is 5 to 20 μm and the mean particle size "b" of the alloy powder B is 25 to 50 μm.

The present invention also relates to a method of producing a hydrogen storage alloy electrode, comprising the steps of: (1) producing, either by atomization or centrifugal spraying, a hydrogen storage-alloy powder A with a mean particle size "a" having any shape selected from the group consisting of spherical shapes, substantially spherical shapes and oval shapes, and a hydrogen storage alloy powder B with a mean particle size "b" having any shape selected from the group consisting of spherical shapes, substantially spherical shapes and oval shapes (wherein, a<b): (2) preparing a paste A containing the alloy powder A, and applying the paste A to a conductive core material; and (3) preparing a paste B containing the alloy powder B, and applying the paste B onto the paste A.

As the above step (1), a step of producing a hydrogen storage alloy powder having a particle size distribution, and sieving the resultant alloy powder into the alloy powder A with a mean particle size "a" and the alloy powder B with a mean particle size "b" may be employed.

The present invention also relates to a hydrogen storage alloy electrode comprising: a conductive core material; and an active material layer which contains a hydrogen storage alloy powder and is carried on the core material, the alloy powder comprising: an alloy powder C having any shape selected from the group consisting of spherical shapes, substantially spherical shapes and oval shapes; and an alloy powder D produced by mechanical crushing, the alloy powder D having on the surface thereof at least one selected from the group consisting of nickel and cobalt.

The alloy powder C may also have on the surface thereof at least one selected from the group consisting of nickel and cobalt.

It is preferable that the alloy powder C has a particle size of not more than 90 μm and a mean particle size of 20 to 40 μm, and the alloy powder D has a mean particle size of 10 to 15 μm.

It is preferable that the ratio of weight $C_w$ of the alloy powder C to weight $D_w$ of the alloy powder D contained in the active material layer, $C_w:D_w$, is 80:20 to 95:5.

The present invention also relates to a method of producing a hydrogen storage alloy electrode, comprising the steps of: (1) producing, either by atomization or centrifugal spraying, a hydrogen storage alloy powder C having any shape selected from the group consisting of spherical shapes, substantially spherical shapes and oval shapes; (2) producing, by mechanical crushing, a hydrogen storage alloy powder D having a rough surface; and (3) preparing a paste containing the alloy powders C and D, and applying the paste to a conductive core material.

The present invention also relates to an alkaline storage battery comprising: a positive electrode; a negative electrode; a separator; and an alkaline electrolyte, the negative electrode being one of the above-described hydrogen storage alloy electrodes.

BEST MODE FOR CARRYING OUT THE INVENTION

Embodiment 1

This embodiment relates to a hydrogen storage alloy electrode comprising: a conductive core material; and an active material layer which contains a hydrogen storage alloy powder and is carried on the core material, the alloy powder having any shape selected from the group consisting of spherical shapes, substantially spherical shapes and oval shapes, the core material comprising a conductive sheet and fibrous or columnar sintered nickel pieces bonded to the surface of the conductive sheet.

As the conductive sheet constituting the conductive core material, a metal plate, metal foil or the like may be employed. The conductive sheet may be perforated.

Figure 2:
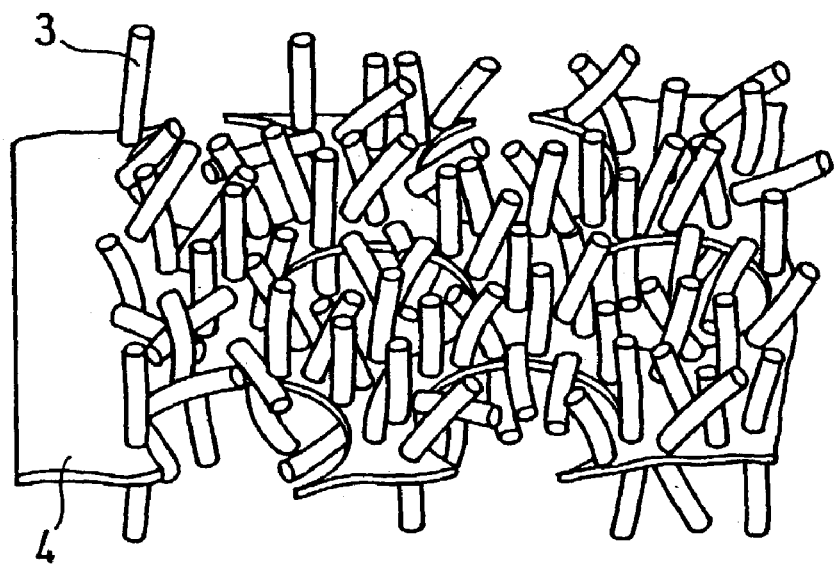
FIG. 2 is a partial oblique view of a conductive core material comprising a conductive sheet and fibrous or columnar sintered nickel pieces bonded to the surface of the conductive sheet.

FIG. 2 shows a partial oblique view of an example of the above-mentioned conductive core material.

Fibrous or columnar sintered nickel pieces 3 each extend from the surface of a perforated conductive sheet 4 in the thickness direction of the core material, so that the core material has a three dimensional structure. A spherical hydrogen storage alloy powder is easily carried between such sintered nickel pieces. Accordingly, the number of contact points between the alloy powder and the conductive core material is increased, increasing current collection paths in the electrode. In addition, the separation of the alloy powder from the core material is prevented. The use of this electrode for an alkaline storage battery makes it possible to provide an alkaline storage battery excellent in both high-rate discharge characteristics and cycle characteristics.

With a structure in which the fibrous or columnar sintered nickel pieces stand erect, a current collection path can only be formed in the thickness direction of the conductive core material. In contrast, with a structure in which a plurality of fibrous or columnar sintered nickel pieces are entangled with each other in the vicinity of the tips thereof, a current collection path can also be formed in the planar direction of the conductive sheet, so that the resistance in the electrode is further reduced, improving the discharge characteristics further.

Preferably, the thickness of the fibrous or columnar sintered nickel pieces increase towards the tips thereof. The use of a core material having such sintered nickel pieces reduces the resistance at the surface layer portion of the electrode and decreases the polarization, thereby further improving the charge/discharge characteristics. Moreover, the surface layer portion of the electrode is improved in mechanical strength, resulting in a further improved alloy powder retention.

The fibrous or columnar sintered nickel pieces may be provided on the conductive sheet by the following process.

First, an adhesive is applied on the surface of the conductive sheet. Next, the conductive sheet is grounded, and resin fibers charged with a charging hood are gradually provided to the surface of the conductive sheet. The charged resin fibers adhere to the surface of the conductive sheet with their fiber ends, in such a manner that they are oriented in the direction perpendicular to the surface of the conductive sheet. After the adhesive becomes dry and the resin fibers are fixed to the surface of the conductive sheet, a nickel coating is formed on the resin fibers by electroless plating, thereby imparting conductivity to the resin fibers. Thereafter, electroplating is performed until the nickel coating has a desired thickness. The thickness of the nickel coating increases towards the tips of the resin fibers, since the electric charge is concentrated at the tips to increase the current density. By firing the resin fibers having a nickel coating that are fixed on the conductive sheet, a desired conductive core material can be produced. At the outermost portion of the core material produced in this process, the sintered nickel pieces have an increased diameter.

In the above-described process, a regenerated cellulose fiber with a mean diameter of 5 to 50 μm and a mean length of 1 to 5 mm is preferably used as the resin fiber.

The amount of nickel for coating the resin fibers fixed per unit area of the conductive sheet is preferably 290 to 310 g/m$^2$.

The mean diameter of the fibrous or columnar sintered nickel piece is preferably 5 to 70 μm. The mean length of the sintered nickel piece is preferably 1 to 5 mm. The specific surface area of the conductive sheet, onto which the fibrous or columnar sintered nickel pieces are fixed, is preferably 10 to 50 m$^2$/g. Preferably, the sintered nickel pieces are disposed at substantially equal intervals on the surface of the conductive sheet.

Increasing the amount of the fibrous or columnar sintered nickel pieces provides a conductive core material having a larger specific surface area than conventional core materials comprising a porous metal material such as a foamed metal sheet. Accordingly, the contact area between the core material having the fibrous or columnar sintered nickel pieces and a hydrogen storage alloy powder becomes larger than that between a foamed metal sheet and a hydrogen storage alloy powder, so that the current collection performance is also improved.

The active material layer carried on the above-mentioned conductive core material contains a hydrogen storage alloy powder having any shape selected from the group consisting of spherical shapes, substantially spherical shapes and oval shapes. As the hydrogen storage alloy, any conventionally used MmNi$_5$ alloy may be preferably used. The spherical hydrogen storage alloy powder can be produced by a known process such as atomization or centrifugal spraying. The mean particle size of the alloy powder is preferably 15 to 30 μm.

The active material layer is formed by applying a paste containing the alloy powder to a conductive core material. The paste may include, in addition to the alloy powder, a thickener, conductive agent, binder, dispersion medium and the like. After application of the paste, the remaining steps, such as formation of electrode plates, may be carried out by conventionally known methods.

Embodiment 2

This embodiment relates to a hydrogen storage alloy electrode comprising: a conductive core material; and an active material layer which contains a hydrogen storage alloy powder and is carried on the core material, the alloy powder having any shape selected from the group consisting of spherical shapes, substantially spherical shapes and oval shapes, the core material being a mesh sheet having a plurality of lines of slits discontinuously formed thereon in a longitudinal direction of the sheet, the slits being opened in directions perpendicular to the sheet in a substantially rhombus-shaped form.

A mesh sheet as described above can be produced as follows.

First, a plurality of lines of slits is discontinuously formed in a conductive sheet in a longitudinal direction of the sheet in order that the plurality of lines of slits are arranged in a staggered manner, leaving slitless portions between longitudinally adjacent slits, wherein a longitudinal length of the slitless portions is shorter than a length of the slits. As the conductive sheet, a metal plate, metal foil or the like may be used.

Figure 3:
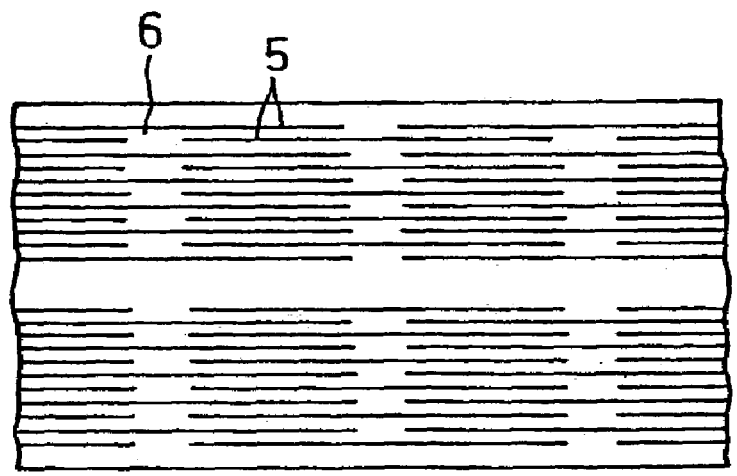
FIG. 3 is a top plan view of a conductive sheet in which slits are formed in a staggered arrangement.

FIG. 3 shows a top plan view of a conductive sheet in which slits are formed in a staggered arrangement. In FIG. 3, each slit 5 preferably has a length of 0.5 to 2 mm. The slits 5 are formed in a staggered arrangement in a conductive sheet 1, leaving slitless portions 6 each having a length of 0.2 to 1 mm between longitudinally adjacent slits. The interval between each of the widthwise adjacent slits is preferably 0.1 to 0.5 mm.

Next, portions that are sandwiched between slits that are adjacent in the width direction of the sheet are bulged upward and downward with respect to the sheet in an alternating manner such that the slits are opened in directions perpendicular to the sheet in a substantially rhombus-shaped form.

Figure 4:
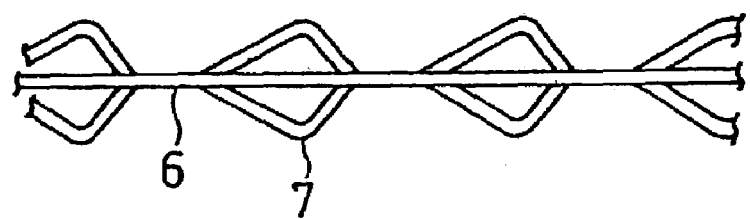
FIG. 4 is a sectional view of a conductive core material having slits that are opened in directions perpendicular to the core material in a substantially rhombus-shaped form.

FIG. 4 shows a sectional view of a conductive core material having slits that are opened in directions perpendicular to the core material in a substantially rhombus-shaped form. Since bulge portions 7 that are oriented in the thickness direction of the core material define lines of substantially rhombus-shaped openings, this core material has a three-dimensional structure. In the slits that are opened in directions perpendicular to the core material in a substantially rhombus-shaped form, a spherical hydrogen storage alloy powder is easily carried. Therefore, the number of contact points between the alloy powder and the core material is increased, increasing current collection paths in the electrode. Moreover, the separation of the alloy powder from the core material is prevented. The use of this electrode for an alkaline storage battery makes it possible to provide an alkaline storage battery excellent in both high-rate discharge characteristics and cycle characteristics.

The active material layer carried on the conductive core material is the same as the one described in Embodiment 1.

Embodiment 3

Figure 5:
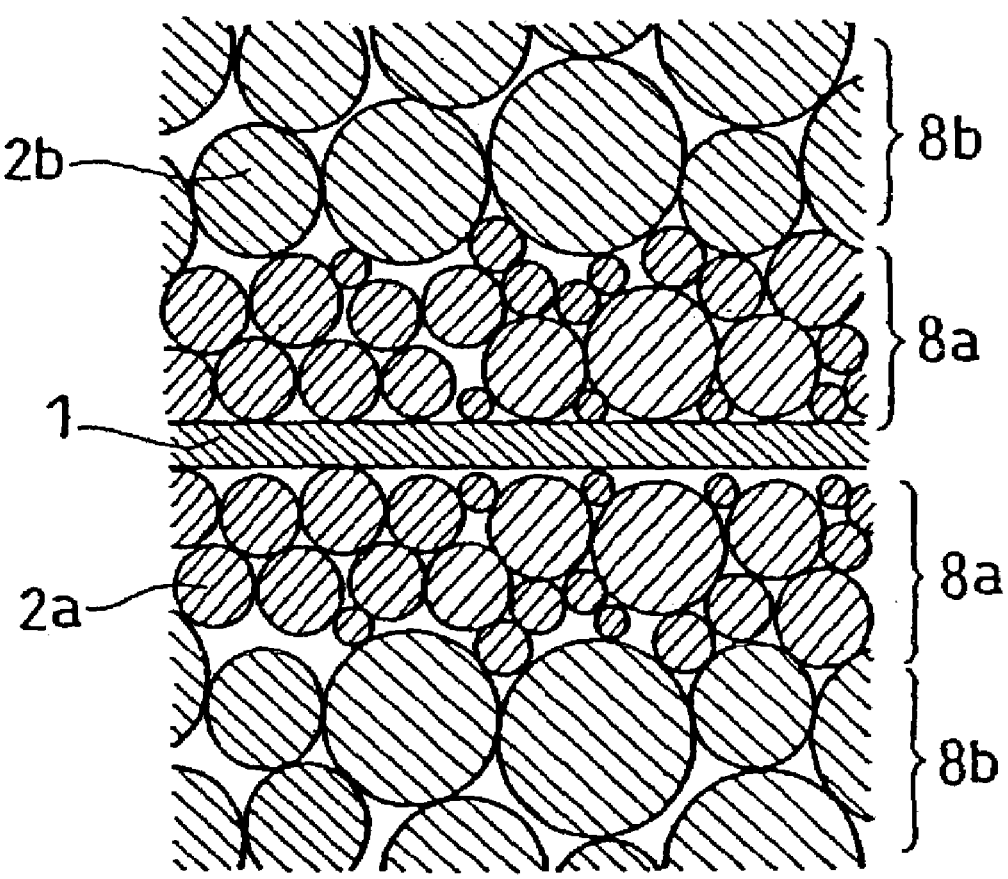
FIG. 5 is a sectional view of a hydrogen storage alloy electrode including: an active material layer A which contains a spherical hydrogen storage alloy powder A with a mean particle size "a" and is carried on a conductive core material; and an active material layer B which contains a spherical hydrogen storage alloy powder B with a mean particle size "b" and is carried on the active material layer A (wherein, a<b).

A hydrogen storage alloy electrode in accordance with this embodiment is described in the following by referring to FIG. 5, which shows a sectional view of the electrode. In FIG. 5, on a conductive core material 1, an active material layer A (8a) containing a hydrogen storage alloy powder A (2a) with a mean particle size "a" is carried. On the active material layer A (8a), an active material layer B (8b) containing a hydrogen storage alloy powder B (2b) with a mean particle size "b" is carried (wherein, a<b). The alloy powders A (2a) and B (2b) each have any shape selected from the group consisting of spherical shapes, substantially spherical shapes and oval shapes.

Figure 1:
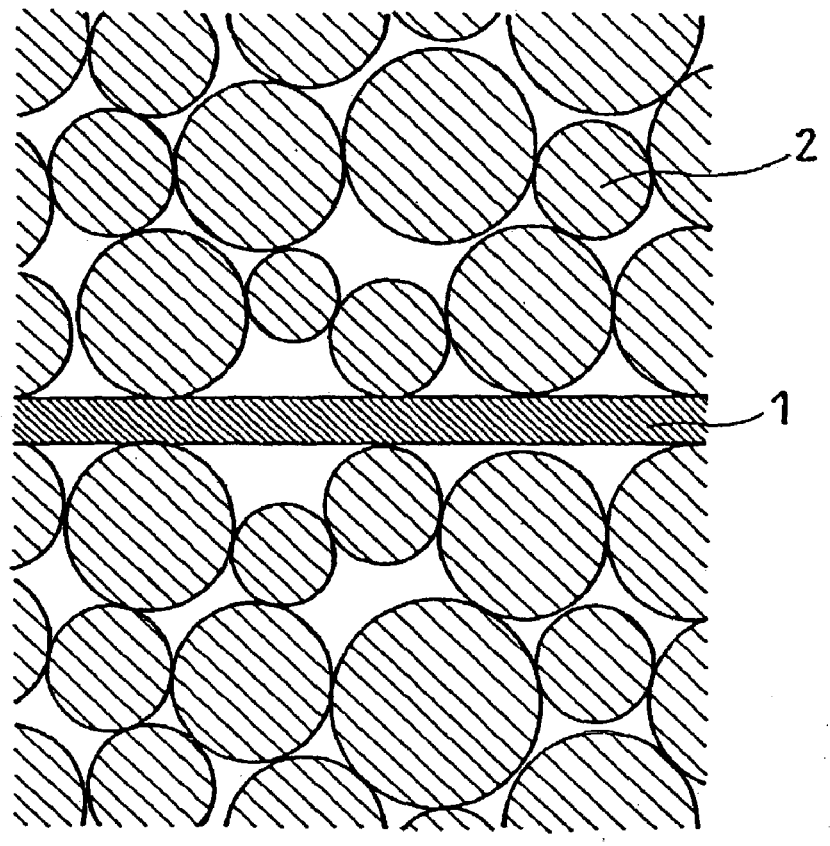
FIG. 1 is a schematic sectional view of a conventional electrode using a spherical alloy powder.

In the above-described electrode, the alloy powder A with a relatively small mean particle size is in contact with the conductive core material. Disposed outside thereof is the alloy powder B with a relatively large mean particle size. Bringing the alloy powder A with a small mean particle size into contact with the conductive core material in this manner can increase the number of current collection points. Accordingly, unlike the case of the conventional electrode shown in FIG. 1, even the use of a spherical alloy powder does not render the contact between the alloy particles and the conductive core material insufficient, so that the reduction in discharge characteristics is suppressed.

Because of its large specific surface area, the alloy powder A with a small mean particle size is susceptible to corrosion by an electrolyte. Therefore, it is preferable that the thickness of the active material layer A is as small as possible, as long as a sufficient number of contact points can be ensured between the alloy powder and the core material. From this point of view, the ratio of thickness $A_d$ of the active material layer A to the thickness $B_d$ of the active material layer B, $A_d:B_d$, is preferably 1:9 to 3:7.

The mean particle size "a" of the alloy powder A is preferably not more than 20 μm from the viewpoint of ensuring a sufficient number of contact points between the alloy powder and the conductive core material. At the same time, it is preferably not less than the 5 μm, because too small a mean particle size of the alloy powder A significantly promotes the corrosion reaction of the alloy. That is, with the use of the alloy powder A having a mean particle size of 5 to 20 μm, it is possible to minimize the corrosion of the alloy by an alkaline electrolyte, while ensuring a sufficient number of current collection paths.

The mean particle size "b" of the alloy powder B is preferably 25 to 50 μm. When the mean particle size of the alloy powder B is less than 20 μm, the too small particle size reduces the hydrogen storage performance, leading to the decrease in electrode capacity and also to the acceleration of corrosion of the alloy. On the other hand, a mean particle size of more than 50 μm decreases the reaction area, thereby reducing the charge/discharge reaction.

In the following, a production process of the above-mentioned electrode is described.

First, a hydrogen storage alloy powder A with a mean particle size "a" and a hydrogen storage alloy powder B with a mean particle size "b" (wherein, a<b) are each produced, either by atomization or centrifugal spraying. Processes such as atomization and centrifugal spraying provide an alloy powder having any shape selected from the group-consisting of spherical shapes, substantially spherical shapes and oval shapes, which is uniform in metal structure, smaller in specific surface area than a crushed alloy powder and excellent in corrosion resistance.

Here, the mean particle size of the alloy powder can be varied by changing the synthesizing conditions such as the temperature of the molten alloy and the jet pressure at which the molten alloy is sprayed into an inert gas. Alternatively, another method may be used in which a hydrogen storage alloy powder having a particle size distribution is produced and the resultant alloy powder is sieved to obtain the alloy powder A with a mean particle size "a" and the alloy powder B with a mean particle size "b". Although this method requires a sieving facility, it has an advantage of being able to fix the synthesizing conditions of the alloy powder and thus to attain a stable production of the alloy powder.

Next, a paste A containing the alloy powder A and a paste B containing the alloy powder B are prepared. The preparation of the pastes may be performed according to any conventionally used method. Then, the paste A containing the alloy powder A with a relatively small mean particle size is first applied to the conductive core material by a conventionally known method such as slitting, followed by drying the applied paste with warm air. Next, the paste B containing the alloy powder B with a relatively large mean particle size is applied on the paste A and dried. In this manner, a desired active material layer comprising two types of layers can be formed. After application of the pastes, the remaining steps, such as formation of electrode plates, may be carried out by conventionally known methods.

Embodiment 4

This embodiment relates to a hydrogen storage alloy electrode comprising: a conductive core material; and an active material layer which contains a hydrogen storage alloy powder and is carried on the core material, the alloy powder comprising: an alloy powder C having any shape selected from the group consisting of spherical shapes, substantially spherical shapes and oval shapes; and an alloy powder D produced by mechanical crushing, the alloy powder D having on the surface thereof at least one selected from the group consisting of nickel and cobalt.

In other words, according to this embodiment, a spherical alloy powder C having a smooth surface and a crushed alloy powder D having a rough surface are used in combination to improve the current collection performance of the electrode, and the surface of the alloy powder D is coated with a particular metal to suppress the dissolution of the constituent elements. Here, the term "coat" as used in the present invention does not necessarily mean that a uniform layer is formed, and it is intended to mean, for example, also the condition in which a particular metal adheres to the surface of the alloy powder.

The metal for coating the surface of the crushed alloy powder D may be any metal, as long as it is capable of effectively adhering to the surface of the alloy powder to form a coating layer and thereby serving the function of suppressing the dissolution of the constituent elements of the alloys into the alkaline electrolyte. It is preferable to use, for example, at least one selected from the group consisting of nickel and cobalt, each of which also serves as a catalyst on the surface of the alloy powder.

In this embodiment, it is sufficient to coat the surface of at least the crushed alloy powder D with a metal. It is, however, effective to also coat the surface of the spherical alloy powder C with at least one selected from the group consisting of nickel and cobalt. This is because the constituent elements, although in a very small amount, may also in some cases be dissolved out from the spherical alloy powder C.

The alloy powder C preferably has a particle size of not more than 90 μm and a mean particle size of 20 to 40 μm. The reason is that an alloy particle with a particle size of more than 90 μm is easily pulverized during charge/discharge cycles, thereby reducing the cycle characteristics. On the other hand, a mean particle size of less than 20 μm reduces the hydrogen storage performance of the alloy particle, and also accelerates corrosion of the alloy powder C. In addition, a mean particle size of more than 40 μm decreases the reaction area of the alloy powder C, thereby reducing the charge/discharge reaction.

The alloy powder D preferably has a mean particle size of 10 to 15 μm. It is empirically known that a crushed alloy powder is pulverized into a mean particle size of about 15 μm during charge/discharge cycles. It is therefore effective to employ a crushed alloy powder of such size, thereby suppressing a further pulverization for the purpose of preventing the reduction in cycle characteristics.

It is preferable that the weight ratio of the alloy powder C to the alloy powder D in the electrode is 80:20 to 95:5, i.e., that the crushed alloy powder D constitutes 5 to 20 wt % of the entire hydrogen storage alloy powder. The reason is as follows: When the weight ratio of the alloy powder D is more than 20 wt %, it is difficult to fill a large amount of alloy powder into the electrode, making it impossible to achieve sufficient performance. When the weight ration of the alloy powder D is less than 5 wt %, the contact between the alloy particles or between the alloy particles and the conductive core material becomes insufficient, making it impossible to improve the discharge characteristics.

In the following, specific examples of the present invention are described.

EXAMPLE 1

Battery A (1) Production of Hydrogen Storage Alloy

Commercially available starting materials, namely, Mm (misch metal), Ni, Co, Mn and Al were each weighed according to a predetermined composition ratio, and molten in a high frequency induction heating furnace. From the crucible containing the resultant molten alloy, the molten alloy was dropped in small portions onto a disc rotating at high speed (approximately 20,000 rpm) in an inert gas, followed by ultraquenching, thereby producing a spherical alloy powder of $MmNi_{3.55}Co_{0.75}Mn_{0.40}Al_{0.30}$. The spherical alloy powder was heat-treated for one hour in an electric furnace controlled at 900° C. Although the heat-treatment of the spherical alloy powder was performed at 900° C. for one hour in this embodiment, it may be performed under different conditions as long as the temperature and time are adequate to suppress the segregation of the alloy powder.

The resultant alloy powder consisted of very regular, spherical particles with a mean particle size of 50 μm. The alloy structure examined by elementary analysis was excellent in uniformity and also had superior hydrogen storage performance.

(2) Production of Alloy Paste

The above-described alloy powder was immersed, under stirring, for 60 minutes in a potassium hydroxide aqueous solution heated to 80° C. with a specific gravity of 1.30, followed by washing with water until the pH of the washing water became 10 or lower.

Thereafter, the washed alloy powder was immersed, under stirring, for 30 minutes in an acetic acid aqueous solution having a pH of 3.0 at 60° C., followed by washing with water until the pH of the washing water became 6 or higher, thereby obtaining a slurry of a hydrogen storage alloy powder containing water as the dispersion medium.

To this slurry, 0.15 part by weight of carboxymethyl cellulose as a thickener, 0.3 part by weight of carbon black as a conductive agent and 0.8 part by weight of a styrene-butadiene copolymer as a binder, each per 100 parts by weight of the alloy powder, were added, and the whole was mixed to produce an alloy paste.

(3) Production of Conductive Core Material

A nickel-plated iron punched metal sheet having a thickness of 0.06 mm, pore size of 2 mm, porosity of 52% was prepared. After application of a phenol-based adhesive (solid content: 20%) to both sides of the punched metal sheet by spraying, the punched metal sheet was grounded.

Meanwhile, piles were prepared by cutting a rayon fiber having a diameter of 15 μm into pieces of 4 mm length. While being charged with a charging hood, the piles were gradually passed through a sieve to adhere to both sides of the grounded punched metal sheet, in such a manner that they were oriented in the vertical direction. When the adhesive became dry and the piles were fixed on the punched metal sheet, any unfixed piles were brushed off with a rolling brush and removed by suction using an exhaust fan. The amount of the piles fixed per unit area of the punched metal sheet, including the pores thereof, was 15 g/m$^2$.

A nickel coating was formed on the fixed piles by electroless plating, followed by electroplating until the thickness of the nickel coating became 2 μm. Thereafter, the piles were removed by firing to produce a conductive core material having on the surface thereof fibrous or columnar sintered nickel pieces with a mean diameter of 18 μm and a mean length of 4 mm. The amount of the sintered nickel pieces fixed per unit area of the punched metal sheet, including the pores thereof, was 75 g/m$^2$. Additionally, the specific surface area of the conductive core material having the sintered nickel pieces on the surface thereof was 30 m$^2$/g.

(4) Production of Electrode

The alloy paste was filled into the conductive core material and dried, followed by pressurization to form an active material layer. The surface of the active material layer was coated with a fluorocarbon resin powder. Then, the resultant electrode plate was cut to produce a hydrogen storage alloy electrode having a width of 35 mm, length of 150 mm, thickness of 0.4 mm and capacity of 2200 mAh.

(5) Production of Battery

The resultant hydrogen storage alloy electrode and a known sintered type nickel positive electrode were spirally wound, with a nonwoven fabric separator made of sulfonated polyolefin interposed therebetween, thereby constructing an electrode assembly. After insertion of the electrode assembly into a metal case, a predetermined amount of electrolyte in which lithium hydroxide was dissolved at 40 g/l in a potassium hydroxide aqueous solution having a specific gravity of 1.30 was injected into the metal case. Thereafter, the top of the case was sealed with a sealing plate to produce a 4/5 A size sealed nickel-metal hydride storage battery A having a nominal capacity of 1500 mAh.

Battery B

A long band-like iron sheet with a thickness of 0.06 mm was prepared. This sheet was fed between a pair of dies consisting of top and bottom dies facing each other, which included a plurality of plate-shaped cutters with a plurality of blades for slit formation arranged at predetermined intervals. Then, the top and bottom dies were brought together and then separated again, thereby discontinuously forming a plurality of lines of slits in the longitudinal direction of the band-like sheet in order that the plurality of lines of slits were arranged in a staggered manner. While bringing the top and bottom dies and separating them again, portions sandwiched between two adjacent slits were caused to bulge upward and downward with respect to the sheet in an alternating manner such that the slits were opened in directions perpendicular to the sheet in a substantially rhombus-shaped form. Thereafter, electroplating was performed on the sheet until a nickel coating of 2 μm was formed thereon, thereby obtaining a mesh sheet. The thickness of the mesh sheet was 0.4 mm.

Here, the length of each slit was 0.5 mm, the interval between slits that were adjacent in the longitudinal direction of the sheet (i.e., longitudinal length of each slitless portion) was 0.2 mm and the interval between slits that are adjacent in the width direction of the sheet was 0.1 mm.

A hydrogen storage alloy electrode was produced in the same manner as the battery A, except that this mesh sheet was used as the conductive core material. The resultant electrode had a width of 35 mm, length of 150 mm, thickness of 0.5 mm and capacity of 2200 mAh. Except for using this electrode, a battery B was produced in the same manner as the battery A.

Battery C

A hydrogen storage alloy electrode was produced in the same manner as the battery A, except that a nickel-plated iron punched metal sheet having a thickness of 0.06 mm, pore size of 2 mm and porosity of 52% was directly used as the conductive core material. The resultant electrode had a width of 35 mm, length of 150 mm, thickness of 0.4 mm and capacity of 2200 mAh. Except for using this electrode, a battery C was produced in the same manner as the battery A.

Battery D

Commercially available starting materials, namely, Mm (misch metal), Ni, Co, Mn and Al were each weighed according to a predetermined composition ratio, and molten in a high frequency induction heating furnace. After cooling the molten alloy, the resultant alloy ingot was mechanically crushed to produce a crushed alloy powder with a mean particle size 30 μm. Except for using this crushed alloy powder, a hydrogen storage alloy electrode was produced in the same manner as the battery A. The resultant electrode had a width of 35 mm, length of 150 mm, thickness of 0.4 mm and capacity of 2200 mAh. Except for using this electrode, a battery D was produced in the same manner as the battery C.

Evaluation of Batteries A to D (1) Discharge Capacity

Each battery was charged at a current of 1 C for 72 minutes, and then discharged at a current of 0.2 C or 3 C until the battery voltage reached 1.0 V. TABLE 1 shows the discharge capacity and average discharge voltage obtained at this time for each battery.

TABLE 1

| Battery | Discharge capacity (mAh) (Average discharge voltage (V)) | |
|---|---|---|
| | 0.2 C | 3 C |
| A | 1500 (1.25) | 1120 (1.10 V) |
| B | 1500 (1.25) | 1070 (1.10) |
| C | 1470 (1.24) | 960 (1.06) |
| D | 1500 (1.25) | 1030 (1.10) |

As seen in TABLE 1, a comparison of the batteries A and B with the batteries C and D shows that the low rate discharge characteristics at 0.2 C of the two groups of batteries were substantially equal. However, in the case of the high rate discharge characteristics at 3 C, the batteries A and B are superior to the batteries C and D in discharge capacity and average discharge voltage. This is because the fibrous or columnar sintered nickel pieces or the mesh structure of the conductive core material of the batteries A and B increased the contact area between the alloy particles and the core material, increasing the current collection paths.

On the other hand, the batteries C and D employed a commonly used punched metal sheet as the conductive core material, so that they were inferior in high rate discharge characteristics to the batteries A and B. The reason is that the batteries C and D had a lower number of contact points between the alloy particles and the core material than the batteries A and B, and thus were inferior in current collection performance. Further, the battery C was inferior in high rate discharge characteristics to the battery D. This is because the battery C, which used the spherical alloy powder, was more disadvantageous in terms of ensuring the contact between the alloy particles or between the alloy particles and the core material than the battery D, which used the crushed alloy powder.

(2) Cycle Characteristic

Figure 6:
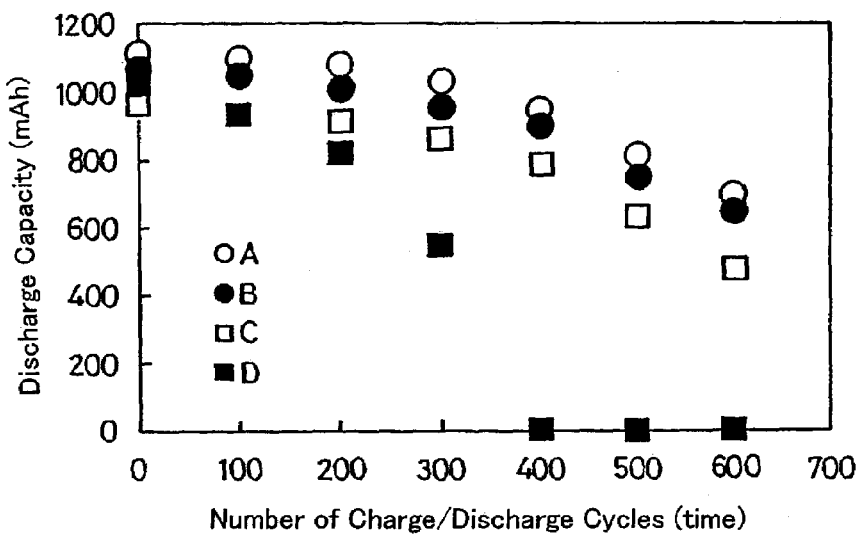
FIG. 6 is a graph showing the relation between the number of charge/discharge cycles and the discharge capacity of batteries A to D obtained in Example 1.

A charge/discharge cycle was repeated, in which each battery was charged at a current of 1 C at 20° C. up to 120% of the theoretical capacity and then discharged at a current of 3 C until the battery voltage reached 1.0 V. FIG. 6 shows the relation between the number of charge/discharge cycles and the battery capacity obtained at this time.

As seen in FIG. 6, the batteries A and B had more improved cycle characteristics than the batteries C and D.

There are two conceivable reasons for this. One is that the batteries A and B used the spherical alloy powder, which was suppressed in the dissolution of the constituent elements and had superior corrosion resistance. The other is that the alloy powder was readily filled into the conductive core material of the batteries A and B because of the fibrous or columnar sintered nickel pieces or the mesh structure thereof. As a result, the number of contact points between the alloy powder and the conductive core material was increased, preventing the peeling of the alloy powder from the core material.

On the other hand, the batteries C and D employed a commonly used punched metal sheet as the conductive core material, so that the alloy powder was easily peeled from the core material and the contact between the alloy particles and the core material or between the alloy particles was thus likely to be reduced. Accordingly, the batteries C and D had decreased cycle characteristics. Further, the battery D had more decreased cycle characteristics than the battery C, because it employed the crushed alloy powder that was susceptible to dissolution of the constituent elements and to corrosion.

EXAMPLE 2

Battery E (1) Production of Hydrogen Storage Alloy

Commercially available starting materials, namely, Mm (misch metal), Ni, Mn, Al and Co were each weighed according to a predetermined composition ratio, and molten in a high frequency induction heating furnace in an inert gas atmosphere. The resultant molten alloy was dropped from the lower portion of the crucible, followed by spraying a high-pressure argon gas to the molten alloy, thereby producing a spherical alloy powder. The resultant alloy powder was heat-treated for one hour in an electric furnace controlled at 900° C.

An analysis of the resultant alloy powder showed that the alloy powder had the composition $MmNi_{3.55}Mn_{0.4}Al_{0.3}Co_{0.75}$ and an extremely uniform alloy structure. Additionally, the particles of the powder were confirmed to have a spherical shape with a smooth surface.

The resultant alloy powder was sieved to produce an alloy powder C' with a mean particle size of 30 μm. Additionally, a portion of the alloy powder C' was classified into an alloy powder A' with a mean particle size of 10 μm and the remaining powder, namely, an alloy powder B'.

(2) Production of Alloy Paste

The alloy powder A' was immersed, under stirring, for 60 minutes in a potassium hydroxide aqueous solution heated to 80° C. with a specific gravity of 1.30, followed by washing with water until the pH of the washing water became 10 or lower.

Thereafter, the washed alloy powder was immersed, under stirring, for 20 minutes in an acetic acid aqueous solution having a pH of 3.4 at 60° C., followed by washing with water until the pH of the washing water became 6 or higher, thereby obtaining a slurry of a hydrogen storage alloy powder containing water as the dispersion medium.

To this slurry, 0.15 part by weight of carboxymethyl cellulose as a thickener, 0.3 part by weight of carbon black as a conductive agent and 0.8 part by weight of a styrene-butadiene copolymer as a binder, each per 100 parts by weight of the alloy powder A', were added, and the whole was mixed to produce an alloy paste A'.

An alloy paste B' was produced in the same manner as described above, except for using the alloy powder B' in place of the alloy powder A'.

(3) Production of Electrode

The alloy paste A' was applied to a punched metal sheet serving as the conductive core material, and dried to form an active material layer A'. Then, the alloy paste B' was applied onto the active material layer A', and dried to form an active material layer B'. Thereafter, the two active material layers carried on the core material were pressurized and the surface thereof was coated with a fluorocarbon resin powder.

The weight ratio of the alloy powder A' contained in the active material layer A' to the alloy powder B' contained in the active material layer B' was fixed at 2:8. Then, the resultant electrode plate was cut to produce a hydrogen storage alloy electrode having a width of 35 mm, length of 150 mm, thickness of 0.4 mm and capacity of 2200 mAh.

(4) Production of Battery

The resultant hydrogen storage alloy electrode and a known sintered type nickel positive electrode were spirally wound, with a nonwoven fabric separator made of nylon interposed therebetween, thereby constructing an electrode assembly. After insertion of the electrode assembly into a metal case, a predetermined amount of electrolyte in which lithium hydroxide was dissolved at 40 g/l in a potassium hydroxide aqueous solution having a specific gravity of 1.30 was injected into the metal case. Thereafter, the top of the case was sealed with a sealing plate to produce a 4/5 A size sealed nickel-metal hydride storage battery E having a nominal capacity of 1500 mAh.

Battery F

An alloy paste C' was prepared in the same manner as described above, except for using the alloy powder C' in place of the alloy powder A'. The alloy paste C' was applied to a punched metal sheet and dried, followed by pressurization to form an active material layer consisting of a single layer. The surface of the active material layer was coated with a fluorocarbon resin powder. Thereafter, the resultant electrode plate was cut to produce a hydrogen storage alloy electrode having a width of 35 mm, length of 150 mm, thickness of 0.4 mm and capacity of 2200 mAh. Except for using this electrode, a battery F was produced in the same manner as the battery E.

Battery G

Commercially available starting materials, namely, Mm (misch metal), Ni, Co, Mn and Al were each weighed according to a predetermined composition ratio, and molten in a high frequency induction heating furnace. After cooling the molten alloy, the resultant ingot of the alloy having the composition $MmNi_{3.55}Mn_{0.4}Al_{0.3}Co_{0.75}$ was heat-treated at 1100° C. for one hour, followed by wet-crushing, thereby producing an alloy powder D' with a mean particle size of 30 μm.

Except for using the alloy powder D' in place of the alloy powder A', an alloy paste D' was prepared in the same manner as that of the battery E.

A battery G was produced in the same manner as the battery E, except for using the alloy paste D' in place of the alloy paste A' to form an active material layer A" carried on the conductive core material, and using the alloy paste C' in place of the alloy paste B' to form an active material layer B" on the active material layer A".

Battery H

Except for mixing the alloy powder C' with the alloy powder D' at a weight ratio of 2:8 and using the resultant alloy powder mixture, an alloy paste E was prepared in the same manner as described above. The alloy paste E was applied to a punched metal sheet and dried, followed by pressurization to form an active material layer consisting of a single layer. Thereafter, the same procedures as used for the battery F were followed to produce a battery H.

Evaluation of Batteries E to H (1) Discharge Capacity

Each battery was charged at 20° C. at a current of 1.5 A up to 120% of the theoretical capacity, and then discharged at 0° C. at a current of 4.5 A until the battery voltage dropped to 1.0 V. At this time, the discharge capacity was determined. In TABLE 2, the discharge capacity of each battery is expressed as a relative value, with the discharge capacity of the battery F defined as 100. The relative value of the discharge capacity is preferably not less than 110.

(2) Cycle Characteristics

A charge/discharge cycle was repeated, in which each battery was charged at 20° C. at a current of 1.5 A up to 120% of the theoretical capacity and then discharged at a current of 1.5 A until the battery voltage reached 1.0 V. Then, the number of cycles that were performed until the discharge capacity decreased to 80% of the initial capacity was determined. In TABLE 2, the cycle number for each battery is expressed as a relative value, with the cycle number for the battery F defined as 100. The relative value of the cycle number may preferably be not less than 90.

TABLE 2

| Battery | Mean particle size of alloy (μm) | | Discharge capacity | Cycle characteristics |
| --- | --- | --- | --- | --- |
| | Layer A | Layer B | | |
| E | 10 | 30 | 118 | 97 |
| F | | 30 | 100 | 100 |
| G | 30 | 30 | 120 | 82 |
| H | | 30 | 122 | 78 |

As seen in TABLE 2, the battery E, which included the active material layer A' containing the spherical alloy A' with a small mean particle size in contact with the core material and the active material layer B' containing the spherical alloy powder B' with a large mean particle size carried on the active material layer A', had more improved discharge characteristics as compared with the battery F. This is because the contact resistance between the core material and the alloy powder was reduced. Additionally, the battery E did not contain any crushed alloy powder that was inferior in terms of corrosion resistance, so that it had better cycle characteristics than the batteries G and H, each of which contained a crushed alloy powder.

EXAMPLE 3

Batteries E1 to E5 were produced in the same manner as the battery E, except that the ratio of thickness of the active material layer A' to the total thickness of the active material layers A' and B' was varied between 0 and 50%. Here, the mean particle sizes of the hydrogen storage alloy powders used for the active material layers A' and B' were fixed at 10 μm and 30 μm, respectively.

Figure 7:
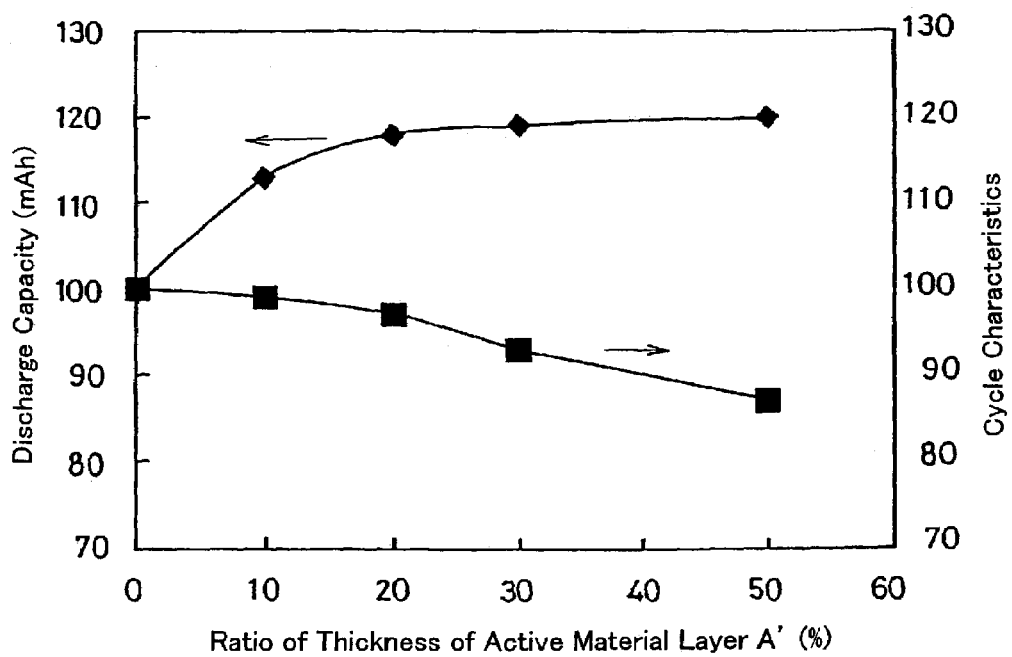
FIG. 7 is a graph showing the discharge capacity and the cycle characteristics of batteries E1 to E5 obtained in Example 3, as a function of the ratio of the thickness of the active material layer A'.

Subsequently, the discharge capacity and the number of cycles that were performed until the discharge capacity decreased to 80% of the initial capacity were determined for each battery in the same manner as in Example 2. Then, the relative values of the discharge capacity and the number of cycles that were performed until the discharge capacity decreased to 80% of the initial capacity were determined for each of the batteries E2 to E5, with the discharge capacity and the cycle number of the battery E1, in which the thickness ratio of the active material layer A' was 0%, each defined as 100. FIG. 7 shows the discharge capacity and the cycle characteristics, as a function of the ratio of the thickness of the active material layer A' to the total thickness of the active material layers A' and B'.

From FIG. 7, it is seen that the batteries E1, E2, E3 and E4, in which the thickness ratios of the active material layer A' were 0%, 10%, 20% and 30%, respectively, had good cycle characteristics. The reason is that the content of the alloy powder with a small mean particle size was small when the thickness ratio of the active material layer A' was small, suppressing the corrosion of the alloy. On the other hand, the discharge capacity was significantly increased when the thickness ratio of the active material layer A' was 10% or higher. This is because the contact resistance between the alloy powder and the core material was reduced. From these results, it can be said that the thickness ratio of the active material layer A' is preferably 10 to 30%.

EXAMPLE 4

Batteries E6 to E10 were produced in the same manner as the battery E, except that the mean particle size of the alloy powder used for the active material layer A' was varied between 1 and 25 μm. Here, the mean particle size of the alloy powder used for the active material layer B' was fixed at 30 μm, and the weight ratio of the alloy powder contained in the active material layer A' to the alloy powder contained in the active material layer B' was fixed at 2:8.

Figure 8:
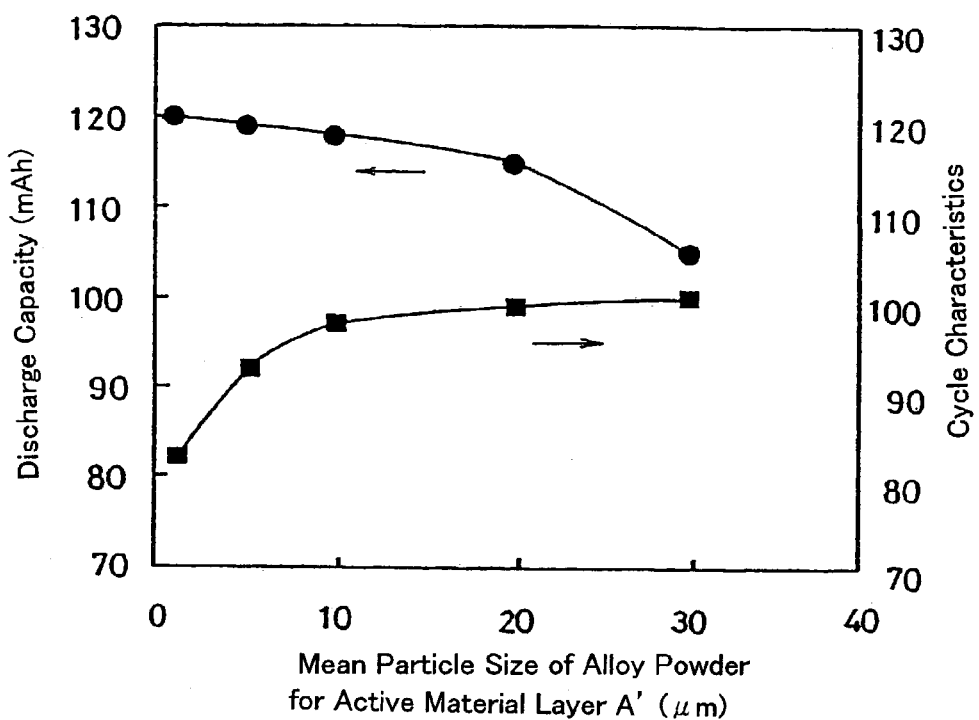
FIG. 8 is a graph showing the discharge capacity and the cycle characteristics of batteries E6 to E10 obtained in Example 4, as a function of the mean particle size of the alloy powder used for the active material layer A'.

Subsequently, the discharge capacity and the number of cycles that were performed until the discharge capacity decreased to 80% of the initial capacity were determined for each battery in the same manner as in Example 2. Then, the relative value of the discharge capacity and the cycle number were determined for each of the batteries E6 to E10, with the discharge capacity and the cycle number of the battery E1 of Example 3 each defined as 100. FIG. 8 shows the discharge capacity and the cycle characteristics, as a function of the mean particle size of the alloy powder used for the active material layer A'.

From FIG. 8, it can be said that the mean particle size of the alloy powder used for the active material layer A' is preferably 5 to 20 μm in order to achieve both sufficient discharge characteristics and cycle characteristics at the same time. The batteries E6 and E7, in which the mean particle sizes of the alloy powder used for the active material layer A' were 1 μm and 5 μm, respectively, had good discharge characteristics because of the reduced contact resistance. However, it is believed that these batteries were not capable of achieving a significant improvement in discharge capacity because of the increased ratio of the very fine alloy powder of low hydrogen storage performance. A mean particle size of less than 5 μm resulted in decreased cycle characteristics. This is presumably because the increased specific surface area of the alloy powder promoted the corrosion of the alloy. On the other hand, the battery E10, in which the mean particle size of the alloy powder used for the active material layer A' was 25 μm, did not have sufficient discharge characteristics, probably because the number of contact points between the alloy and the core material was decreased.

The batteries E7, E8 and E9, in which the mean particle sizes of the alloy powder used for the active material layer A' were 5 μm, 10 μm and 20 μm, respectively, had discharge capacities and cycle characteristics that were well-balanced with one another. Therefore, it can be said that the mean particle size of the alloy powder used for the active material layer A' is preferably 5 to 20 μm.

EXAMPLE 5

Batteries E11 to E17 were produced in the same manner as the battery E, except that the mean particle size of the alloy powder used for the active material layer B' was varied between 15 and 100 μm. Here, the weight ratio of the alloy powder contained in the active material layer A' to the alloy powder contained in the active material layer B' was fixed at 2:8, and the mean particle size of the alloy powder used for the active material layer A' was fixed at 10 μm.

Figure 9:
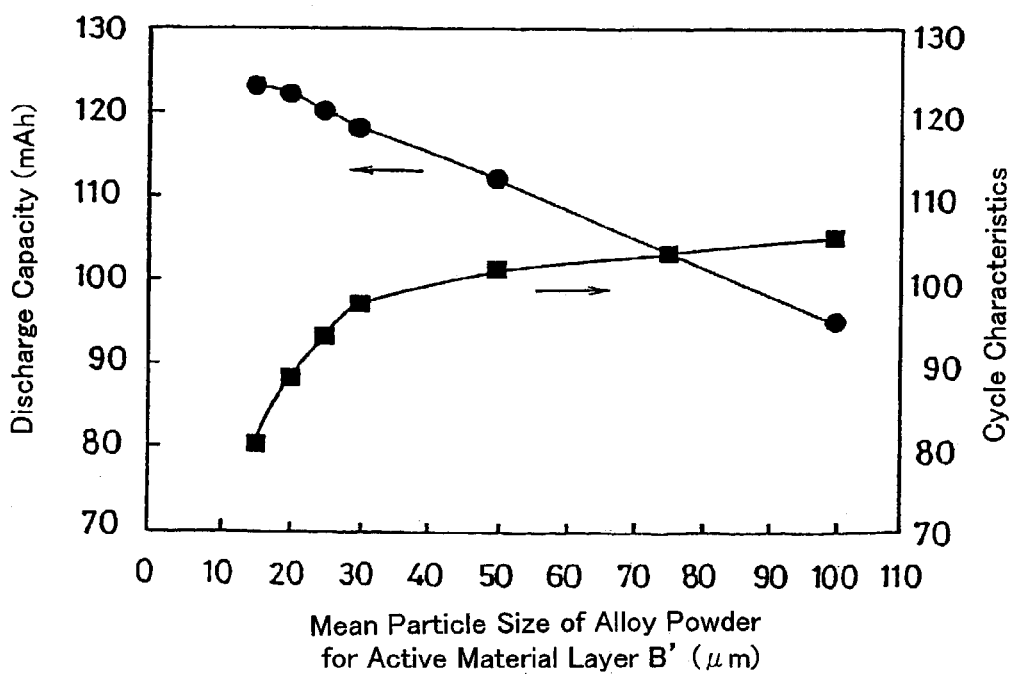
FIG. 9 is a graph showing the discharge capacity and the cycle characteristics of batteries E11 to E17 obtained in Example 5, as a function of the mean particle size of the alloy powder used for the active material layer B'.

Subsequently, the discharge capacity and the number of cycles that were performed until the discharge capacity decreased to 80% of the initial capacity were determined for each battery in the same manner as in Example 2. Then, the relative value of the discharge capacity and the cycle number were determined for each of the batteries E11 to E17, with the discharge capacity and the number of cycles that were performed until the discharge capacity decreased to 80% of the initial capacity of the battery E1 of Example 3 each defined as 100. FIG. 9 shows the discharge capacity and the cycle characteristics, as a function of the mean particle size of the alloy powder used for the active material layer B'.

From FIG. 9, it is seen that the batteries E11 and E12, in which the mean particle sizes of the alloy powder used for the active material layer B' were 15 μm and 20 μm, respectively, had decreased cycle characteristics owing to the accelerated corrosion of the alloy, although having good discharge characteristics because of their relatively large specific surface areas. It is also seen that the batteries 16 and 17, in which the mean particle sizes of the alloy powder used for the active material layer B' were 75 μm and 100 μm, respectively, had decreased discharge characteristics due to the decrease in the reaction area and the increase in the contact resistance between the alloy powders.

The batteries E13, E14 and E15, in which the mean particle sizes of the alloy powder used for the active material layer B' were 25 μm, 30 μm and 50 μm, respectively, had discharge capacity and cycle characteristics that were well-balanced with one another. Therefore, it can be said that the mean particle size of the alloy powder used for the active material layer B' is preferably 25 to 50 μm.

EXAMPLE 6

Battery 1

(1) Production of Hydrogen Storage Alloy Powder A1 by Atomization

Commercially available starting materials, namely, Mm (misch metal), Ni, Mn, Al and Co were each weighed according to a predetermined composition ratio, and molten in a high frequency induction heating furnace in an inert gas atmosphere. The resultant molten alloy was dropped from the lower portion of the crucible, followed by spraying a high pressure argon gas to the molten alloy, thereby producing a spherical hydrogen storage alloy powder A'. The resultant alloy powder A' was heat-treated for one hour in an electric furnace controlled at 900° C.

An analysis of the resultant alloy powder A' showed that the alloy powder A' had the composition $MmNi_{3.55}Mn_{0.4}Al_{0.3}Co_{0.75}$ and an extremely uniform alloy structure. Additionally, the particles of the powder were confirmed to have a spherical shape with a smooth surface.

Further, the above-described alloy powder A' was sieved into a particle size of not more than 90 μm, thereby producing a hydrogen storage alloy powder A1 with a mean particle size of 30 μm. Here, the mean particle size was confirmed by measurement of the particle size distribution.

(2) Production of Hydrogen Storage Alloy Powder B1 by Crushing

Commercially available starting materials, namely, Mm (misch metal), Ni, Mn, Al and Co were each weighed according to a predetermined composition ratio, and molten in a high frequency induction heating furnace, and the resultant molten alloy was cast-molded to produce an ingot. The ingot was heat-treated for one hour in an electric furnace controlled at 1100° C., followed by mechanical crushing in an inert gas atmosphere, thereby producing a hydrogen storage alloy powder B'. Subsequently, the alloy powder B' was sieved into a mean particle size of 15 μm, thereby producing a hydrogen storage alloy powder B1 having the composition $MmNi_{3.55}Mn_{0.4}Al_{0.3}Co_{0.75}$.

(3) Coating of Hydrogen Storage Alloy Powder B1

After being washed with acid, the alloy powder B1 was introduced into a mixed solution heated to 80° C. and containing 30 g/l nickel sulfate and 10 g/l sodium acetate. Into the solution, 15 g/l sodium hypophosphite was added, and the whole was stirred for 20 minutes. Thereafter, the alloy powder was washed with water and dried, thereby producing an alloy powder B1', in which the surface of an alloy powder B1 was coated with Ni.

The nickel content in the alloy powder B1' was confirmed to be 2 to 5 wt %.

(4) Production of Electrode 90 parts by weight of the resultant alloy powder A1, 10 parts by weight of the alloy powder B1', 0.15 part by weight of carboxymethyl cellulose as a thickener, 0.3 part by weight of carbon black as a conductive agent, 0.8 part by weight of styrene-butadiene copolymer as a binder and water as a dispersion medium were mixed together to prepare an alloy paste.

This paste was applied to both sides of a nickel-plated iron punched metal sheet having a thickness of 60 μm, pore size of 1 mm and porosity of 42%, followed by drying and pressurization. The surface thereof was further coated with a fluorocarbon resin powder, and a hydrogen storage alloy electrode having a width of 35 mm, length of 150 mm, thickness of 0.4 mm and capacity of 2200 mAh was produced.

(5) Production of Battery

The above-described hydrogen storage alloy electrode and a known sintered type nickel positive electrode were spirally wound, with a nonwoven fabric separator made of nylon interposed therebetween, thereby constructing an electrode assembly. After insertion of the electrode assembly into a metal case, a predetermined amount of electrolyte in which lithium hydroxide was dissolved at 40 g/l in a KOH aqueous solution having a specific gravity of 1.30 was injected into the metal case. Thereafter, the top of the case was sealed with a sealing plate to produce a 4/5 A size sealed battery 1 having a capacity of 1500 mAh.

Battery 2

(1) Coating of Hydrogen Storage Alloy Powder A1

After being washed with acid, the alloy powder A1 having a mean particle size of 30 μm, produced in the same manner as described in the above (1) for the battery 1, was immersed in a KOH aqueous solution heated to 80° C. with a specific gravity of 1.30 at 80° C., and the whole was stirred for one hour. After being washed with water, the alloy powder was introduced into a mixed solution of 30 g/l nickel sulfate and 10 g/l sodium acetate heated to 80° C. Into the solution, 15 g/l sodium hypophosphite was added, and the whole was stirred for 20 minutes.

Thereafter, washing with water and drying were performed, thereby producing a hydrogen storage alloy powder A1', in which the surface of the hydrogen storage alloy powder A1 was coated with Ni.

(2) Production of Electrode and Battery

A sealed battery 2 was produced in the same manner as the battery 1, except for using the alloy powder A1' and the alloy powder B1'. The alloy powder B1' was produced in the same manner as described in the above (3) for the battery 1.

Battery 3

A spherical hydrogen storage alloy powder A1 was produced in the same manner as that of the battery 1.

100 parts by weight of the hydrogen storage alloy powder A1, 0.15 part by weight of carboxymethyl cellulose as a thickener, 0.3 part by weight of carbon black as a conductive agent, 0.8 part by weight of a styrene-butadiene copolymer as a binder and water as a dispersion medium were mixed together to prepare an alloy paste.

Except for using this alloy paste, a sealed battery 3 for comparison was produced in the same manner as the battery 1.

Battery 4

90 parts by weight of the hydrogen storage alloy powder A1 that had been produced in the same manner as that of the battery 1 was mixed with 10 parts by weight of the hydrogen storage alloy powder B1 that had been mechanically crushed to a mean particle size of 15 μm, thereby obtaining an alloy powder mixture.

100 parts by weight of this mixture, 0.15 part by weight of carboxymethyl cellulose as a thickener, 0.3 part by weight of carbon black as a conductive agent, 0.8 part by weight of a styrene-butadiene copolymer as a binder and water as a dispersion medium were mixed together to prepare an alloy paste. A sealed battery 4 was produced in the same manner as the battery 1, except for using this alloy paste.

Evaluation of Batteries 1 to 4

(1) Discharge Capacity

Each battery was charged at 20° C. at a current of 1.5 A up to 120% of the theoretical capacity, and then discharged at 0° C. at a current of 3.0 A until the battery voltage dropped to 1.0 V, whereupon the discharge capacity (initial discharge capacity) was determined.

The initial discharge capacity of each battery was expressed as a relative value, with the initial discharge capacity of the battery 3 defined as 100. The results are shown in TABLE 3. It is believed that the relative value of the discharge capacity is preferably not less than 110.

(2) Cycle Characteristics

A charge/discharge cycle was repeated, in which each battery was charged at 20° C. at a current of 1.5 A up to 120% of the theoretical capacity and then discharged at a current of 1.5 A until the battery voltage reached 1.0 V. Then, the number of cycles that were performed until the discharge capacity decreased to 80% of the initial discharge capacity. The cycle number for each battery was expressed as a relative value, with the cycle number for the battery 3 defined as 100. The results are shown in TABLE 3. It is believed that the relative value of the cycle number is preferably not less than 90.

TABLE 3

| Battery | Alloy powder | Discharge capacity | Cycle characteristics |
|---|---|---|---|
| 1 | Alloy powder A1 Ni-coated alloy powder B1' | 117 | 94 |
| 2 | Ni-coated alloy powder A1' Ni-coated alloy powder B1' | 115 | 97 |
| 3 | Alloy powder A1 | 100 | 100 |
| 4 | Alloy powder A1 Alloy powder B1 | 118 | 83 |

As is clearly seen from the results obtained for the batteries 1 to 4, the discharge characteristics were improved by mixing the alloy powder B1 produced by crushing with the alloy powder A1. The reason is presumably that the use of the alloy powder produced by mechanical crushing increased the reaction surface area and improved the contact between the core material and the alloy powder.

As is clearly seen from the results obtained for the batteries 1 and 4, sufficient cycle characteristics could be ensured by coating the surface of the mechanically crushed alloy powder with Ni. Additionally, as is seen from the results obtained for the batteries 1 and 2, the cycle characteristics could be further improved by coating the surface of the alloy powder produced by atomization with Ni. This is probably because the corrosion reaction of the alloy was further suppressed by coating the surface of the spherical alloy powder with Ni.

EXAMPLE 7

In this example, an examination was made of the effect exerted on the battery characteristics by the particle size of the spherical hydrogen storage alloy powder A produced by atomization. A powder that had been classified with a 20 μm sieve and coated with Ni on the surface thereof was used as the crushed alloy powder B mixed with the spherical alloy powder A. Additionally, the weight mixing ratio of the spherical alloy powder A to the crushed alloy powder B was set at 90:10.

The same spherical alloy powder A' as the one produced in Example 6 was classified, using sieves, to produce spherical alloy powders A2, A3, A4, A5, A6 and A7 having mean particle sizes of 15, 20, 30, 40, 45 and 65 μm, respectively. Sealed batteries 5 to 10 were produced in the same manner as in Example 6, except for using the alloy powders A2, A3, A4, A5, A6 and A7, respectively. The discharge characteristics and cycle characteristics of the resultant batteries were determined in the same manner as in Example 6, and expressed as relative values. The results are shown in TABLE 4.

TABLE 4

| Battery | Sieve size (μm) | Mean particle size of alloy powder A (μm) | Discharge capacity | Cycle characteristics |
|---|---|---|---|---|
| 5 | 40 | 15 | 122 | 86 |
| 6 | 40 | 20 | 120 | 90 |
| 7 | 75 | 30 | 117 | 94 |

TABLE 4-continued

| Battery | Sieve size (μm) | Mean particle size of alloy powder A (μm) | Discharge capacity | Cycle characteristics |
|---|---|---|---|---|
| 8 | 75 | 40 | 112 | 96 |
| 9 | 90 | 45 | 109 | 97 |
| 10 | 100 | 65 | 108 | 89 |

From TABLE 4, it is seen that with a decrease in the mean particle size of the hydrogen storage alloy powder A, the discharge characteristics of the resultant batteries improved, whereas the cycle characteristics decreased. The battery 5, which used the alloy powder A2 having a mean particle size of 15 μm, was insufficient in cycle characteristics. The reason is that with a decrease in the particle size, the discharge characteristics improved owing to an increase in the specific surface area of the alloy powder, whereas the cycle characteristics reduced due to an increase in the corroded surface area.

In addition, the battery 10, which used the alloy powder A7 with a mean particle size of 65 μm that had been classified by a 100 μm sieve, had a decreased discharge capacity during the initial cycles because of its small reaction area.

From the results shown in TABLE 4, it can be said that the spherical alloy powder A preferably has a particle size of not more than 90 μm and a mean particle size of 20 to 40 μm.

EXAMPLE 8

In this example, an examination was made of the effect exerted on the battery characteristics by the particle size of the hydrogen storage alloy powder B produced by crushing. A powder with a mean particle size of 30 μm that had been classified with a 90 Am sieve was used as the spherical alloy powder A produced by atomization. Additionally, the mixing ratio by weight of the spherical alloy powder A to the crushed alloy powder B was 90:10.

The same hydrogen storage alloy powder B' as the one produced in Example 6 was classified, using sieves, to produce crushed alloy powders B2, B3, B4, B5 and B6 having mean particle sizes of 7, 10, 12, 15 and 20 μm, respectively. Sealed batteries 11 to 15 were produced in the same manner as the battery 1, except for using the crushed alloy powders B2, B3, B4, B5 and B6 after coating the surface of these powders with Ni. The discharge characteristics and cycle characteristics of the resultant batteries were determined in the same manner as in Example 6, and expressed as relative values. The results are shown in TABLE 5.

TABLE 5

| Battery | Mean particle size (μm) | Discharge capacity | Cycle characteristics |
|---|---|---|---|
| 11 | 7 | 117 | 83 |
| 12 | 10 | 118 | 90 |
| 13 | 12 | 118 | 91 |
| 14 | 15 | 117 | 94 |
| 15 | 20 | 114 | 89 |

From TABLE 5, it can be seen that the batteries, in which the mean particle size of the crushed alloy powder B was 10 to 15 μm, were excellent in both discharge characteristics and cycle characteristics. However, the batteries 11 and 15, in which the mean particle sizes of the crushed alloy powder B were as small as 7 μm and as large as 20 μm, respectively, had decreased cycle characteristics, although having good discharge characteristics. In the case of the battery 11, it is believed that an increase in the specific surface area of the alloy powder B promoted the corrosion of the alloy powder by the alkaline electrolyte. In the case of the battery 15, it is believed that the alloy powder B with a large particle size was pulverized during charge/discharge cycles, promoting corrosion of the surface of the resulting alloy particles that were not coated with Ni. From these observations, it is seen that the mean particle size of the crushed alloy powder B is preferably 10 to 15 μm.

EXAMPLE 9

In this example, an examination was made of the effect exerted on the battery characteristics by the weight ratio of the spherical hydrogen storage alloy powder A to the crushed hydrogen storage alloy powder B in the hydrogen storage alloy electrode. The weight ratio of the spherical alloy powder A to the crushed alloy powder B was set at 95:5, 90:10, 80:20 or 75:25.

A powder with a mean particle size of 30 μm that had been classified with a 90 μm sieve was used as the spherical alloy powder A, and a powder with a mean particle size of 15 μm that had been classified with a 20 μm sieve and coated with Ni on the surface thereof was used as the crushed alloy powder B. The rest of the procedures were conducted in the same manner as the battery 1 to produce sealed batteries 16 to 19. The discharge characteristics and cycle characteristics of the resultant batteries were determined in the same manner as in Example 6, and expressed as relative values. The results are shown in TABLE 6.

TABLE 6

| Battery | Mixing ratio by weight Alloy powder A: Alloy powder B | Discharge capacity | Cycle characteristics |
|---|---|---|---|
| 16 | 95:5 | 112 | 96 |
| 17 | 90:10 | 117 | 94 |
| 18 | 80:20 | 120 | 91 |
| 19 | 75:25 | 116 | 89 |

From TABLE 6, it is seen that the batteries, in which the ratio of the crushed alloy powder B in the entire alloy powder was 5 to 20 wt %, were excellent in both discharge characteristics and cycle characteristics. On the other hand, the battery in which the ratio of the crushed alloy powder B was 25 wt %, had insufficient cycle characteristics, although having good discharge characteristics. The reason is presumably that with an increase in the mixing ratio of the crushed alloy powder B, the corrosion of the alloy was promoted during charge/discharge cycles, resulting in exhaustion of the electrolyte. From these observations, it can be said that the ratio of the crushed alloy powder B in the entire hydrogen storage alloy powder is preferably 5 to 20 wt %.

It is noted that although the crushed alloy powder was coated with nickel by an electroless process in the above-described examples, this should not be construed as limiting. A similar effect can also be achieved by coating the surface of the powder with nickel and cobalt, each of which is the constituent element of the hydrogen storage alloy, by an electrolytic process, etching process with acid or alkaline solution, or the like.

INDUSTRIAL APPLICABILITY

The present invention uses a spherical hydrogen storage alloy powder, which is resistant to pulverization, as well as to corrosion by an alkaline electrolyte, and improves the contact between an electrode core material and an alloy powder, thereby providing an alkaline storage battery excellent in both discharge characteristics and cycle characteristics.

The invention claimed is:

1. An alkaline storage battery comprising: a positive electrode; a negative electrode; a separator; and an alkaline electrolyte, said negative electrode being a hydrogen storage alloy electrode comprising:

a conductive core material; and an active material layer which contains a hydrogen storage alloy powder and is carried on said core material, said alloy powder having any shape selected from the group consisting of spherical shapes, substantially spherical shapes and oval shapes, said core material being a mesh sheet having a plurality of lines of slits discontinuously formed thereon in a longitudinal direction of said sheet, said slits each having a plane perpendicular to said sheet extending therethrough such that portions of the sheet on opposing sides of each slit extend along said plane in directions perpendicular to said sheet in a substantially rhombus-shaped form.

* * * * *

UNITED STATES PATENT AND TRADEMARK OFFICE
CERTIFICATE OF CORRECTION

PATENT NO.        : 7,247,409 B2
APPLICATION NO. : 10/370265
DATED             : July 24, 2007
INVENTOR(S)       : Kazutaka Ikeda et al.

It is certified that error appears in the above-identified patent and that said Letters Patent is hereby corrected as shown below:

On the title page of the Letters Patent,

Under section "(65)", insert section

-- (63) Related U.S. Application Data

Continuation-In-Part of application No.
   PCT/JP01/06954, filed August 10, 2001 --

Signed and Sealed this

Twentieth Day of November, 2007

JON W. DUDAS
*Director of the United States Patent and Trademark Office*